United States Patent [19]

Lynch

[11] Patent Number: 4,594,966
[45] Date of Patent: Jun. 17, 1986

[54] COLLAPSIBLE HEAD COVERING FOR ANIMALS

[76] Inventor: Michael D. Lynch, Box 85, Burbank, S. Dak. 57010

[21] Appl. No.: 621,056

[22] Filed: Jun. 15, 1984

Related U.S. Application Data

[63] Continuation of Ser. No. 456,421, Jan. 7, 1983, abandoned.

[51] Int. Cl.$^4$ .................. A01K 25/00; A01K 29/00
[52] U.S. Cl. .................. 119/130; 119/104; 119/151
[58] Field of Search .................. 119/65, 66, 67, 104, 119/130, 131, 133, 142, 151, 153; 54/80, 81; 73/188, 189

[56] References Cited

U.S. PATENT DOCUMENTS

| | | | |
|---|---|---|---|
| 41,670 | 2/1864 | Becker et al. | 119/65 |
| 495,215 | 4/1893 | Bean | 119/52 R |
| 803,851 | 11/1905 | Pyle | 119/52 R |
| 955,005 | 4/1910 | Snyder | 119/65 |
| 963,805 | 7/1910 | Petro | 119/52 R |
| 1,384,721 | 7/1921 | Johnson | 119/131 |

Primary Examiner—Robert P. Swiatek
Assistant Examiner—Kris R. Schulze
Attorney, Agent, or Firm—Merchant, Gould, Smith, Edell, Welter & Schmidt

[57] ABSTRACT

A device for controlling the movement of an animal is provided which includes a cone-shaped covering (10) for the animal's head. The covering (10) is made from a collapsible, light-impermeable, durable material. A closed end (11) is constructed to prevent suffocation of the animal when the covering is placed on the animal's head for a relatively short period of time. A rigid member (14) is provided at an open end (12) of the covering (10) to support the end (12) in an open state allowing the animal's head to enter the covering interior and to provide a collar about the shoulders of the animal whereby pressure may be exerted upon the animal to direct the movement of the animal while confined in the covering. A handle or hand hold area (15) is provided so that the user may securely grasp the rigid member (14) to manipulate the device.

6 Claims, 4 Drawing Figures

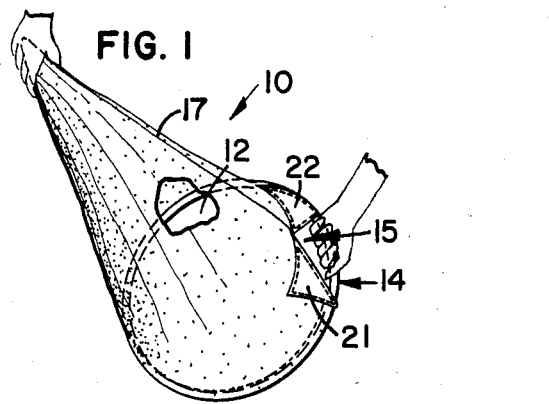
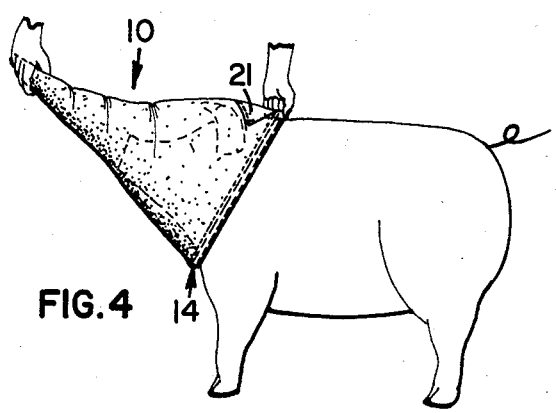
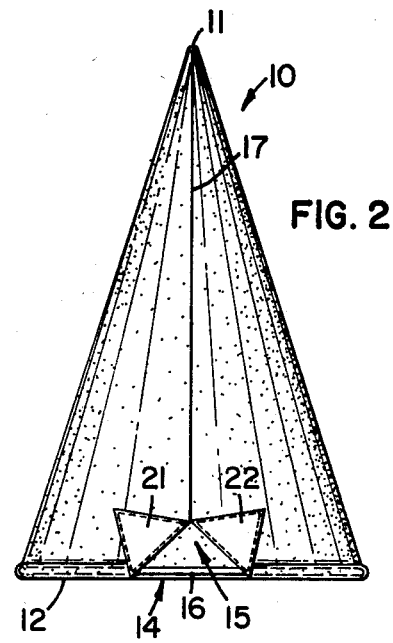
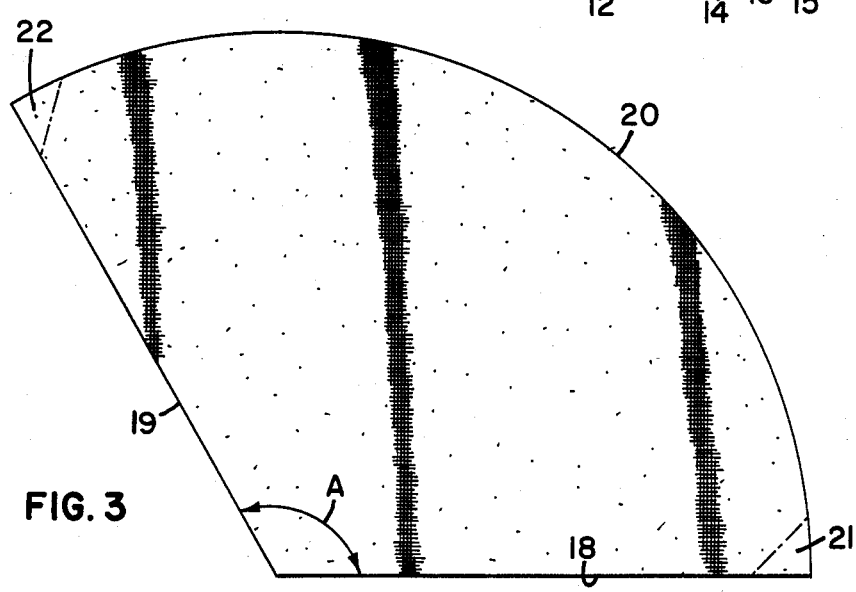

COLLAPSIBLE HEAD COVERING FOR ANIMALS

This is a continuation, of application Ser. No. 456,421, filed Jan. 7, 1983, now abandoned.

TECHNICAL FIELD

The present invention relates to devices used to control the movement of an animal and more particularly to a device which covers the head of an animal in a manner allowing a person to direct the animal in a rearward direction.

BACKGROUND

Controlling the movement of an animal in confined areas has been and remains a serious problem for animal producers. The problem is particularly present in the hog producer's situation where a significant portion of the work involved with the raising of the hogs includes moving the animal from one confined area to another. For example, in the production of hogs the farrowing process generally involves the use of a farrowing crate or free stall. A mother sow is individually held in the crate or stall for a period of time for the purpose of giving birth to her litter. When this has been accomplished she is moved to an area containing a number of other hogs. Most of today's farrowing crates or stalls are constructed to prevent the mother sow from turning around once she is in the stall and from climbing up and over the top of the crate. Because of the presence of a top on the crate, problems of a new nature have arisen for the producer when it is desired to move the sow out of the crate to a different place.

In the past, hog producers used a variety of devices to force the hog to back up out of the crate and on to a new location. More often than not, the hog will refuse to back out of the crate, preferring instead to move forward, but forward movement is prevented by the construction of the crate or stall. It is not uncommon for the hog producer to resort to force to get the sow to back up and out of the confined area. An example list of prior art devices used to accomplish this goal includes: a gate placed in front of the animal and moved rearwardly in increments against the head of the animal until the animal is out of the stall, a basket placed over the head of the animal which encourages the animal to back up in order to get out of the basket, electric probes, and canes, switches and clubs which require the use of force on the part of the producer. Despite the widespread use of such prior art devices, most producers would agree that the devices are essentially ineffective. The sow eventually backs out of the crate or other type of confined area, but oftentimes the price of this movement is injury to the sow and/or injury to the user of the prior art device. Injury to either the sow or the user is a serious problem which defeats the producer's ultimate goal of profiting from the production of the animal in that added expense is incurred when an injury results.

Movement of an animal, such as a pig, from a confined farrowing area is but one example of a situation where the above-named prior art devices are used by the producer. Other situations in which such prior art devices have proved equally ineffective are situations where it is necessary to isolate one animal in a group of animals for vaccination, sorting, loading, etc. It is not unusual to find that the prior art devices allow the pig to control the device, as well as the user of the device, to much the same degree as the user is controlling the pig and the device.

What is needed is a device which allows a person to safely and effectively control and direct the movement of the pig for a relatively short period of time. The device must be easy to handle and without potential to do bodily harm to the animal. It should be universal in its application to all types of situations in which a producer needs to control the animal, and thus replace all of the various types of ineffective prior art devices presently being used. It is believed the present invention is such a universal device capable of allowing the user sufficient control over the animal in order to reach the necessary goal whether that goal is moving an animal in a rearward direction, calming an animal, or isolating the animal momentarily.

SUMMARY OF THE PRESENT INVENTION

The present invention is a device which allows a person to control and direct the movement of an animal for a period of time. The device is a head covering made from a collapsible, light-impermeable material such as canvas. It is advantageous that the covering be collapsible in order that it may be inserted into relatively small narrow areas for placement over the animal's head. It may be constructed in the shape of a cone with the apex of the cone closed and the base of the cone open. The open end provides the inlet through which the animal's head is inserted and removed from the covering. The covering is of sufficient size to prevent the animal's nose from being pressed up against the closed end of the covering thus allowing a breathing space as well as preventing the animal from using its nose to affect the control of the device by the user.

The open end of the covering includes a rigid member which supports and thus keeps this end of the covering open at all times. The rigid member further serves as a collar around the shoulders of the animal to allow the user to exert pressure upon the animal's body in directing the movement of the animal while its head is confined within the covering.

Additionally, a handle is provided so that the covering may be firmly grasped by the user and held on to while manipulating the device. These and other aspects of the present invention will be discussed in more detail in the description which follows.

BRIEF DESCRIPTION OF THE DRAWINGS

FIG. 1 is a view in perspective of a preferred embodiment of the present invention with a portion broken away to show the interior thereof.

FIG. 2 is a side elevational view of the preferred embodiment of the present invention.

FIG. 3 is a top plan view of a portion of the present invention prior to construction thereof.

FIG. 4 is a perspective view of the present invention in use on a pig.

DETAILED DESCRIPTION OF A PREFERRED EMBODIMENT OF THE PRESENT INVENTION

In the drawings a preferred embodiment of the present invention is shown. The invention is a cone-shaped head covering 10 which is placed over the head of the animal in order to control and direct the movement of the animal for the short time the covering is kept on the animal's head. The covering is constructed from any material which is durable, light-weight, collapsible, and which does not let light pass therethrough. Preferably the material is inexpensive and canvas has been found to be suitable in satisfactorily meeting the construction requirements.

Referring now to FIGS. 1 and 2, the covering 10 has a closed first end 11 at the apex of the cone shape. The second end 12 of the covering 10, which forms the base of the cone shape, is left open. The open end 12 provides a circular opening which is of sufficient size to allow the covering 10 to be placed over the head of an animal with ease. And, as the covering is collapsible, it may be inserted through an opening in a stall or like area, where known prior art devices cannot be positioned, in front of the animal. For purposes of discussion only, the description of the invention will be given as one would use the invention on a pig. However, it should be understood that the invention is not solely limited to use on pigs and has instead a much broader application.

At the open end 12 of the covering 10 a rigid member 14 is secured. An endless, tubular rod or ring 14 made of steel has been found suitable to achieve the objectives of the invention. The rigid member or rod 14 is secured about the opening 12 in any suitable manner which will maintain the open condition of this end of the covering. The rod 14 should be selected having a diameter which will substantially create an air-permeable seal about the shoulders of the pig. It is important that there not be any substantial gaps between the pig's body and the rigid member 14 which would be large enough to allow the pig to interfere with the control of the device by inserting its feet or toes into the gaps and apply force upon a portion of the covering. The rigid member or ring 14 serves as a collar which allows the user to exert a pressure downwardly upon the body of the pig, e.g. its shoulders, and with this pressure safely force the pig to move in a particular direction, generally rearwardly. Thus, a good fit between the pig's body and the ring 14 is a significant factor in the effective use of the covering 10.

Preferably a hand-hold area 15 on the device is provided so that the user may readily grasp the device and hold on to it firmly during its use. In the preferred embodiment the hand hold area 15 as constructed provides that a portion 16 of the rigid ring 14 serves as a handle. To expose a portion 16 of the ring for this purpose, the material of the covering adjacent the ring is slit and folded back upon itself to open an area in the covering 10 large enough to accommodate the hand of a person as the person holds on to the adjacent portion 16 of the ring 14. This type of hand-hold area provides a handle suitable for the user to manipulate the device as desired. For certain uses of the device it may be preferable to provide an extended handle (not shown) which will give the user a greater reach in the use of the device.

To construct the device the selected material is cut in a single piece in a manner providing three sides 18, 19, 20 to the piece. See FIG. 3. A first side 18 and second side 19 adjacent thereto are cut as straight lines and define an angle A of approximately 120 degrees therebetween. The third side 20 extends between the first and second sides 18, 19 and is generally curvilinear. The first and second sides 18, 19 are stitched together to define the cone shape of the covering 10, its open interior and its closed first end 11. The third side 20 forms a free edge of the open second end 12. A steel ring 14 is selected having a circumference approximately equal to the length of the third side 20 as calculated after the first and second sides 18, 19 are stitched together. Prior to securing the ring 14 to the material, the hand hold area 15 is formed by slitting a short length of the covering from the free edge 20 to a pre-determined distance towards the closed end 11. In the preferred embodiment a short length of the stitched seam 17, joining the first and second sides 18, 19, is opened. The material is then folded back upon itself on both sides of the slit, away from the slit. The resulting folded portions 21, 22 are then stitched to secure the folds, thereby forming the open area 15 in the covering 10. In the alternative, the open area may be formed prior to stitching or joining the two sides 18, 19 together. This is accomplished by folding and stitching a triangular portion 21, 22 of each side 18, 19, respectively, near the third side 20, back upon itself. Thus, when the two sides 18, 19 are joined together the opening will be formed by the adjacent already folded back portions 21, 22.

The ring 14 is then secured about the remaining portion of the second end free edge 20. The third side 20 forming a free edge of the open end 12 is folded back upon the ring 14 to surround and encase the ring leaving exposed only that portion 16 of the ring 14 adjacent the open area 15 defined by the triangular folded portions 21, 22. The ring 14 is secured within the covering 10 by stitching the folded back free edge 20 to the covering. The ring 14 may slidably move about in the resulting covering pocket.

It should be appreciated that the invention may be constructed in any number of sizes for use on animals ranging in weight from thirty to seven hundred pounds, and that in each case the size of the covering should be selected to insure that the distance from the closed end to the open end is sufficiently long to allow room for the animal to breathe and prevent suffocation during the time the animal's head is confined therein.

Turning now to FIGS. 1 and 4, to use the invention a person need only grasp the ring 14 in the hand hold area 15 firmly and position the open second end 12 of the covering 10 directly in front of the animal. The closed end 11 of the covering 10 may be held by the user's other hand to extend the covering outwardly to form a channel-like passageway in the covering interior for the animal's head to enter as the covering open end 12 is drawn over the head. When the head of the animal is contained within the covering 10 such that the ring 14 is substantially fitting snugly about the animal's shoulders, the user may then exert pressure downwardly upon the ring 14 and hence upon the animal's shoulders to direct the animal to move in the direction desired, generally backwards.

The invention allows the user to direct the movement of the animal due to the fact that the covering 10 substantially obstructs the animal's vision. Normally, an animal, like a pig, will stand still when its vision is obstructed or blocked. The covering 10 then has the beneficial effect of calming the animal and blocking its vision such that it will not move about without some guidance. Furthermore, the construction of the invention is such that little, if no light filters through the fabric or weave of the covering material, but a small amount of light will enter the covering through the gaps which will exist between the covering's round second end 12 and the non-circular shape of the animal's body which contacts the open end 12 of the covering. The light which enters the covering 10 through these gaps is noticed by the pig and it is a natural tendency for the animal to want to go to the lighted area rather than stay in the dark covering.

Thus, the user is assisted in directing the animal in a rearward direction by the animal itself which believes its rearward movement will allow it to get out of the covering 10. The pig, in a sense, follows the covering 10 in an effort to get out of it. Thus, the user may guide the animal as it moves rearwardly to escape the covering.

The covering 10 provides a much-needed device to use with animals in any number of situations where control of the animal's, movement is necessary for a relatively short period of time. Not only is excessive force not required in order to control the animal, but injury to both the user and the animal is prevented. Of course, modifications in the preferred embodiment as described herein would be possible in keeping with the spirit of the invention. And, other uses are envisioned including using the covering as a carrying device for moving small or baby animals, as a device for catching a relatively wild animal, etc. Such modifications and uses are believed to be within the scope of the claims which follow.

What is claimed is:

1. A device for manually directing and controlling the rearward movement of a pig without attaching said device to the pig, said device comprising:
   a covering constructed from a substantially light-impermeable, collapsible fabric, and having a first closed end and a second open end, said open end being generally circular and constructed to receive only the head of a pig, with said closed end being constructed to surround the nose of the pig; and
   means, secured at said covering open end, for supporting and keeping said end in a constant open condition so that said device can be placed over the head of a pig and quickly removed, said means including a rigid ring substantially encased by said covering and sized to engage the shoulders of the pig to allow pressure to be exerted upon the shoulder area of the pig's body as the pig is guided thereby in a rearward direction with the pig's head being confined within said covering.

2. The device of claim 1 further including means for exposing a portion of said rigid ring apart from said covering, said means including a portion of said covering having an opening therein so that said exposed ring portion may be freely grasped by a person using said covering.

3. The device of claim 2 wherein said covering is canvas and has a conical shape with said first end defining as apex.

4. A method of manually directing and controlling the rearward movement of a pig comprising the steps of:
   placing over the head of the pig a collapsible, cone-shaped covering constructed from a light-impermeable fabric, said covering having a first closed end and a second open end, said open end being constructed to receive the head of the pig with said closed end being constructed to contain the snout of the pig, and said covering having a rigid member secured to said open end to support and maintain said end in an open condition; and
   exerting pressure upon the pig's body by grasping said rigid member and pressing the rigid member against the shoulder area of the pig while maintaining the covering over the pig's head to thereby guide the pig in a rearward direction while controlling its movements.

5. The method of claim 4 including the step of grasping said closed end with one hand while grasping said rigid member with the other hand to direct the pig as it moves rearwardly to escape the covering.

6. A device for manually directing and controlling the rearward movement of a pig, without attaching said device to the pig, comprising:
   a generally conically shaped covering constructed from a substantially light-permeable, collapsible material, and having a first closed end defining an apex and a second open end, said open end being generally circular and constructed to receive only the head of a pig, with said closed end being constructed to surround the nose of the pig, said covering being sized and shaped to prevent the pig's nose from pressing against said closed end;
   means, secured at said covering open end, for supporting and keeping said end in a constant open condition so that said device can be placed over the head of a pig and quickly removed, said means including a rigid ring substantially encased by said covering and sized to engage the shoulders of the pig to allow pressure to be engaged upon the shoulder area of the pig's body as the pig is guided thereby in a rearward direcion with the pig's head being confined within said covering; and
   means for exposing a portion of said rigid ring apart from said covering, said means including a portion of said covering having an opening therein so that said exposed ring portion may be freely grasped by a person using said covering.

* * * * *

UNITED STATES PATENT AND TRADEMARK OFFICE
CERTIFICATE OF CORRECTION

PATENT NO. : 4,594,966

DATED : June 17, 1986

INVENTOR(S) : Michael D. Lynch

It is certified that error appears in the above-identified patent and that said Letters Patent is hereby corrected as shown below:

Column 5, line 50, "as" should be --an--;

Column 6, line 27, "light-permeable" should be --light-impermeable--;

Column 6, line 43, "direcion" should be --direction--.

Signed and Sealed this

Eleventh Day of November, 1986

Attest:

DONALD J. QUIGG

Attesting Officer

Commissioner of Patents and Trademarks